US011146402B2

(12) United States Patent
Smith, III et al.

(10) Patent No.: US 11,146,402 B2
(45) Date of Patent: Oct. 12, 2021

(54) NON-REPUDIATION METHOD AND SYSTEM

(71) Applicant: Monkton, Inc., Wilmington, DE (US)

(72) Inventors: Harold Smith, III, Vienna, VA (US); Stephen Thompson, Falls Church, VA (US)

(73) Assignee: Monkton, Inc.

( * ) Notice: Subject to any disclaimer, the term of this patent is extended or adjusted under 35 U.S.C. 154(b) by 173 days.

(21) Appl. No.: 16/193,329

(22) Filed: Nov. 16, 2018

(65) Prior Publication Data

US 2019/0158294 A1  May 23, 2019

Related U.S. Application Data

(60) Provisional application No. 62/587,882, filed on Nov. 17, 2017.

(51) Int. Cl.

| | | |
|---|---|---|
| *H04L 9/14* | (2006.01) | |
| *H04L 9/32* | (2006.01) | |
| *H04L 9/30* | (2006.01) | |
| *H04L 9/08* | (2006.01) | |
| *H04L 29/06* | (2006.01) | |
| *H04W 12/069* | (2021.01) | |

(52) U.S. Cl.
CPC .......... *H04L 9/3247* (2013.01); *H04L 9/0861* (2013.01); *H04L 9/0877* (2013.01); *H04L 9/14* (2013.01); *H04L 9/30* (2013.01); *H04L 9/3213* (2013.01); *H04L 9/3226* (2013.01); *H04L 9/3242* (2013.01); *H04L 9/3268* (2013.01); *H04L 9/3297* (2013.01); *H04L 63/0442* (2013.01); *H04L 63/0823* (2013.01); *H04W 12/069* (2021.01); *H04L 2209/80* (2013.01); *H04L 2463/121* (2013.01)

(58) Field of Classification Search
CPC .............. H04L 9/3247; H04L 63/0823; H04L 9/3268; H04L 9/3297
See application file for complete search history.

(56) References Cited

U.S. PATENT DOCUMENTS

| | | |
|---|---|---|
| 5,226,079 A | 7/1993 | Holloway |
| 5,790,669 A | 8/1998 | Miller et al. |
| 6,167,518 A | 12/2000 | Padgett et al. |
| 6,336,105 B1 | 1/2002 | Conklin et al. |

(Continued)

OTHER PUBLICATIONS

International Search Report of related PCT/US2018/061504 dated Feb. 7, 2019.

*Primary Examiner* — Ellen Tran
(74) *Attorney, Agent, or Firm* — The Belles Group, P.C.

(57) ABSTRACT

In one embodiment, the present disclosure is directed to a system for digital authentication, the system including a server and a device. The device includes a first processor and a second processor separate and distinct from the first processor and dedicated solely to security functionality. The second processor is programmed to generate a public key and a private key, and to use the private key and to-be-signed signature data to generate digital signatures, including a first digital signature. The device transmits the public key and the first digital signature to the server. The server stores the public key to uniquely identify the device or a user of the device in subsequent communications between the server and device.

19 Claims, 4 Drawing Sheets

(56) References Cited

U.S. PATENT DOCUMENTS

| | | |
|---|---|---|
| 6,904,521 B1 | 6/2005 | Jivsov |
| 7,000,111 B1 * | 2/2006 | Dent ................. G06F 7/723 |
| | | 235/375 |
| 7,568,222 B2 | 7/2009 | Randle et al. |
| 7,623,659 B2 | 11/2009 | Huang et al. |
| 2001/0037453 A1 | 11/2001 | Mitty et al. |
| 2004/0053642 A1 * | 3/2004 | Sandberg ............ H04L 9/006 |
| | | 455/558 |
| 2004/0151323 A1 | 8/2004 | Olkin et al. |
| 2006/0156398 A1 | 7/2006 | Ross et al. |
| 2013/0311768 A1 | 11/2013 | Fosmark et al. |
| 2015/0312041 A1 * | 10/2015 | Choi ............... H04L 63/0861 |
| | | 713/175 |
| 2017/0099148 A1 | 4/2017 | Ochmanski et al. |
| 2017/0346836 A1 * | 11/2017 | Holland .............. H04W 4/80 |
| 2018/0144147 A1 * | 5/2018 | Nix ................. H04L 9/0869 |

\* cited by examiner

NON-REPUDIATION METHOD AND SYSTEM

CROSS REFERENCE TO RELATED APPLICATIONS

The present application claims the benefit of U.S. Provisional Patent Application No. 62/587,882, filed Nov. 17, 2017, which is incorporated herein by reference.

BACKGROUND

Non-repudiation provides proof of the origin and integrity of transmitted data. For example, a digital signature for an email enables the recipient to trust that the received email was from the indicated sender. There is similarly a need to provide non-repudiation for communications that use mobile applications, mobile operating systems, and internet-of-things (IoT) devices. For example, if a user is using his smartphone to communicate with his bank, it is important for the bank to ensure that the user indicated is in fact the owner of the bank account in question and not a hacker trying to steal money from another's account. With the previous example, credentials can be exfiltrated from a device and used on another device, thus breaking the chain of trust if there is no means to marry a user to a specific device.

In certain existing solutions, a user logs into a mobile application ("app"). The app owner will then cache the session tokens that the mobile app creates and then keep calling the tokens, thus causing inefficiencies. Further, in certain smartphone payment services, a dedicated security processor on the phone is utilized. This processor can store encrypted payment information used for verifying a user's identify. But the processor is only used for a one-time identification of the user, not a perpetual identification as is often needed when a user is utilizing an app to transmit and receive sensitive information over a period of time.

Thus, there remains a need for a convenient and effective solution to the technological problem of enabling the perpetual identification of a mobile device or its user for the purposes of non-repudiation.

BRIEF SUMMARY

The present disclosure provides a solution to the technological problem identified above. Specifically, the present disclosure programs the security-dedicated processor of the mobile device in question to enable the effective and reliable perpetual identification of the device. The invention can further enable a single sign on such that, once, once the user has proven his or her identity, in the future the user could use the same long-term identifier to identify the user across other apps on a device or to other devices.

The present disclosure may be directed, in one aspect, to a system for digital authentication, the system comprising a server; a device comprising a first processor; and a second processor separate and distinct from the first processor and dedicated solely to security functionality, the second processor programmed to generate a public key and a private key; and use the private key and to-be-signed signature data to generate digital signatures, including a first digital signature; and wherein the device transmits the public key and the first digital signature to the server; wherein the server stores the public key to uniquely identify the device or a user of the device in subsequent communications between the server and device.

In another aspect, a method of providing digital authentication includes providing a device comprising a first processor and a second processor separate and distinct from the first processor, the second processor configured to provide security functionality; generating, by the second processor of the device, a public key and a private key; generating, using the private key and to-be-signed signature data, digital signatures, the digital signatures including a first digital signature; transmitting, by the device, the public key and the first digital signature to a server; and storing, by the server, the public key to uniquely identify the device or a user of the device in subsequent communications between the server and device.

In yet another aspect, an electronic device providing digital authentication includes a first processor; and a second processor separate and distinct from the first processor and dedicated solely to security functionality, the second processor programmed to generate a public key and a private key; use the private key and to-be-signed signature data to generate digital signatures, including a first digital signature; wherein the device transmits the public key and the first digital signature to the server to enable the server to store the public key to uniquely identify the device or a user of the device in subsequent communications between the server and device.

BRIEF DESCRIPTION OF THE DRAWINGS

The present disclosure will become more fully understood from the detailed description and the accompanying drawings, wherein.

DETAILED DESCRIPTION

Figure 1:
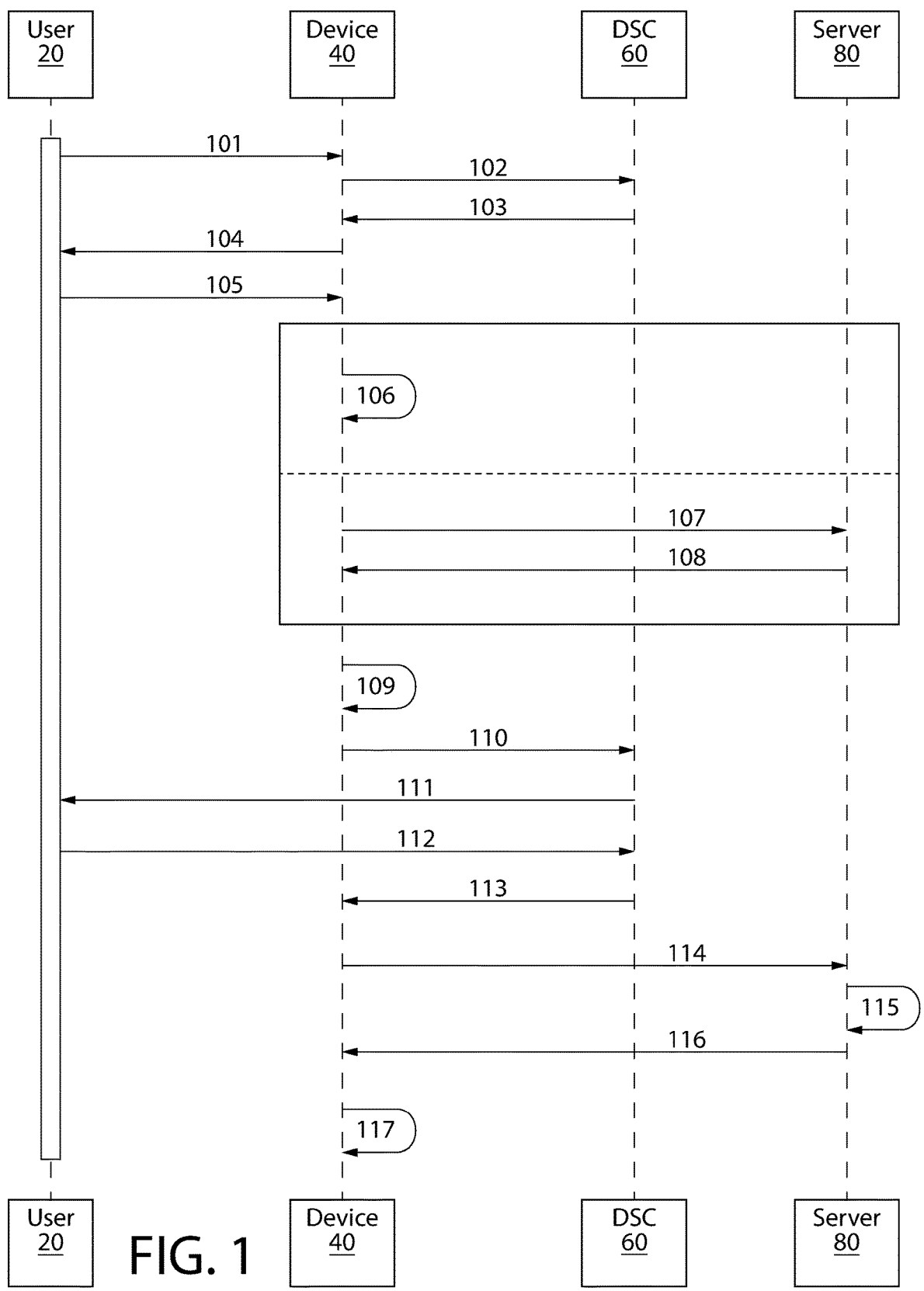
FIG. 1 is a flowchart of a process for Dedicated Security Component (DSC) key generation according to one embodiment.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls. Further, where steps are recited in describing a process embodiment, the steps do not necessarily need to be carried out in the order indicated in the described embodiment.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, microcontroller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy disks, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Overview of DSC Methodology

Disclosed herein is a methodology that can be used to identify a user of an application ("app") on a device by leveraging a second processor, such as a Trusted Execution Environment, Secure Enclave Processor, or Dedicated Security Component. The second processor will be referred to as the "DSC" in the embodiments described below, but is not so limited. Many mobile phones and other devices (including mobile devices, computers, and iOT devices) have such a DSC in addition to the device's main processor. The DSC can be embedded in or attached to the device, and can provide an enclave to store keys and other secrets used by the operating system of devices.

In the embodiments disclosed herein, the identity of the device is maintained through a cryptographic key located in the DSC that provides assurance that the authenticated user, on the specified device, in the specified app, can provide non-repudiation that the device has not changed. This provides assurance for trusted operations when the device interacts with a server.

In the exemplified embodiment, the system authenticates the user of a smartphone. In other embodiments, the system authenticates the user of another device. In yet other embodiments, the system authenticates the device itself, such as a non-internet-enabled device forming part of an internet of things.

In certain embodiments, a user or process ("user") will install an app on a device having a DSC. Upon initialization of the app, the app will instruct the DSC to generate within the DSC a long term identity key pair (LTIK) within the DSC. The LTIK includes a public key and a private key. The DSC will share the long term identity public key with the device (step 103). The device will then send that public key to the server during the user's initial authentication.

The DSC prohibits the private key of the key pair from being exported from the DSC, as a security feature of the DSC. This ensures that only the DSC can access and perform cryptographic operations with the DSC-secured long term identity, such as signing and decryption. This is a form of non-repudiation that the device itself is an authentication factor and the signature generated by the DSC can be trusted. In the instance the long term identity is destroyed in the DSC, via policy or an action the user data will be wiped from the device and the user will be forced to authenticate again, thus generating a new long term identity.

After the device's initial authentication, the LTIK public key will be sent to the server and associated with that device. By the server storing the public key, the authenticated user on a device will have the long term identity stored to identify that specific device in a perpetual manner. New long term identity key pairs can be generated, but do not have to be.

After the device's initial authentication, the LTIK public key is sent to the server and associated with that device. Subsequent attempts to authenticate after the initial authentication will generate to-be-signed signature data, which may be or include a secret (described below) and/or a timestamp indicating a date and time of the generation of the device signature), and cause the to-be-signed signature data to be signed with the associated long term identity private key within the DSC. It is noted that while the use of a secret is described in the embodiment below, in other embodiments other to-be-signed signature data can be used in place of a secret. It is further noted that the server can validate the timestamp to ensure that the digital signature was generated within a predetermined period of time, and can validate that the secret was not previously recorded with the server.

This DSC signed signature can then be sent to the server. When the server receives the request from the device, it will unpack the long term identity signature from the request, retrieve the devices long term identity public key from its database, and verify the signature. If the signature is valid for that device, the device action will be allowed to move forward. In the event the request cannot be validated, the device request will be terminated.

Dual Modes of Session Management

Depending on the security constraints of the app being developed, there could be two paths of validation of the signed secret. The two possible options are a sliding timed out session token or forcing validation with each request. Depending on the design of the DSC, the forced validation could present reauthorization with the DSC at inconvenient times.

The optimal means to validate a session is to have the user open the app and attempt to sync with the server. The app performs the secret signature operation with the DSC. The signature is then presented to the server for validation. When the secret is validated, the server issues a token that expires after a set period of time (for example, an hour), refreshes on a sliding scale (for example every 3 minutes when a server connection occurs), but has a maximum life of a set period of time (for example 2-hour maximum life from issuance). This will enable the user to use the software as desired, maintain a friendly user experience, and ensure the tokens cannot be exfiltrated and used within other applications or devices.

To authenticate every request, the user may be required to provide their authentication factor during every request. This may lead to several back to back authentication factor requests when performing specific operations.

Secret Generation

In high value transactions, such as signing a piece of confidential data, it may be useful to force the user to sign the request, which can be forced if desired. When the user initiates a session with the server, two potential paths of non-repudiation with that server can occur. These formats don't necessarily need to be followed but describe a means to prevent replay attacks.

In one instance, the device generates a secret that is signed and shared with the server. This will be a unique identifier (random generated data) in base64 format concatenated with a pipe "I" character followed by a date time stamp. For instance: ShPLzLpGzi6acTXgljU2H1xQL84KI2017-08-10T15:45:25+00:00.

In another instance, the server the device will be interacting with generates a secret that is signed and shared with the server. This will be a unique identifier (random generated data) in base64 format concatenated with a pipe "I" character followed by a date time stamp. For instance: ShPLzLpGzi6acTXgljU2H1xQL84KI2017-08-10T15:45:25+00:00.

Request Generation

The device is programmed to generate a request to the server. In one embodiment, the generation of the request includes generating request data; generating a secret or receiving the secret from the server; combining the request data and the secret to form the to-be-signed signature data; signing, by the private key, the to-be-signed signature data to generate a request digital signature for the request; and transmitting the public key and the request digital signature to the server, the server validating the request digital signature with the public key.

The request data can include a timed window signature pair (TWSP) comprising a TWSP public key and a TWSP private key, the TWSP public and private keys having an expiration timestamp of when the TWSP public and private keys expire, the timestamp being configurable or a default value, and the server validating that the expiration timestamp has not been exceeded. In one embodiment, the private key signing the to-be-signed signature data is the TWSP private key, and the public key validating the request digital signature is the TWSP public key. Further, when the expiration timestamp is approached or exceeded, the device generates new TWSP public and private keys.

In another embodiment, the server generates an authentication context token comprising public and secret data. The to-be-signed signature data is fed into a hash-based message authentication code (HMAC) parameter as a message; the secret data of the authentication context token is fed into the HMAC as a key; the HMAC generates the request digital signature; the device transmits the public data of the authentication context token and the request digital signature to the server; the server retrieves the secret data based on the public data; and the serve validates the request digital signature with the secret data.

Exemplified Process for DSC Key Generation (FIG. 1)

FIG. 1 provides a flow chart for a process for DSC key generation according to one embodiment. A user 20 or process ("user") will install an app on a device 40 having a DSC 60. The device and mobile app can then be launched (step 101). Upon initialization of the app, the app will instruct the DSC to generate within the DSC a long term identity key pair (LTIK) (step 102), also known as an asymmetric cryptographic key pair ("key pair") within the DSC, provided the key pair does not already exist (step 102). The LTIK includes a public key and a private key. The DSC will share the long term identity public key with the device (step 103).

The user will then be prompted to authenticate with the device using some means of authentication, such as a password, a one time token, or a fingerprint. (step 104). Once the user has authenticated with the device (step 105), the device can generate a secret to sign on the device, or the device can ask the server 80 to generate a secret for it (step 107). If the server generates the secret, the server will return the secret to the device (step 108). As discussed above, while certain embodiments may use a secret or combined secret, the invention is not so limited, as other to-be-signed data can be used.

The device then combines the secret with other metadata from the device to create a combined secret (step 109). The combined secret is then presented to the DSC to be signed (step 110). The DSC then prompts the user to authenticate with the device (step 111). Once the user has authenticated with the DSC (step 112), the DSC performs the signature operation using the LTIK private key, returning the signature and the LTIK public key (step 113). The device then sends the combined secret, the signed combined secret, the LTIK public key, user authentication, and other information (such as but not limited to device information and GPS coordinates) to the server (step 114).

The server then performs a series of validation steps (step 115). The server validates the user and stores the LTIK public key, validates the combined secret and its signature, and generates authentication context tokens the device will use to identify itself with the server. The authentication context tokens are sent back to the device (step 116), and device stores the authentication context tokens for future use (step 117). The authentication context token can include public and secret data, be shared between the device and the server; and be stored in the device or the server.

Figure 2:
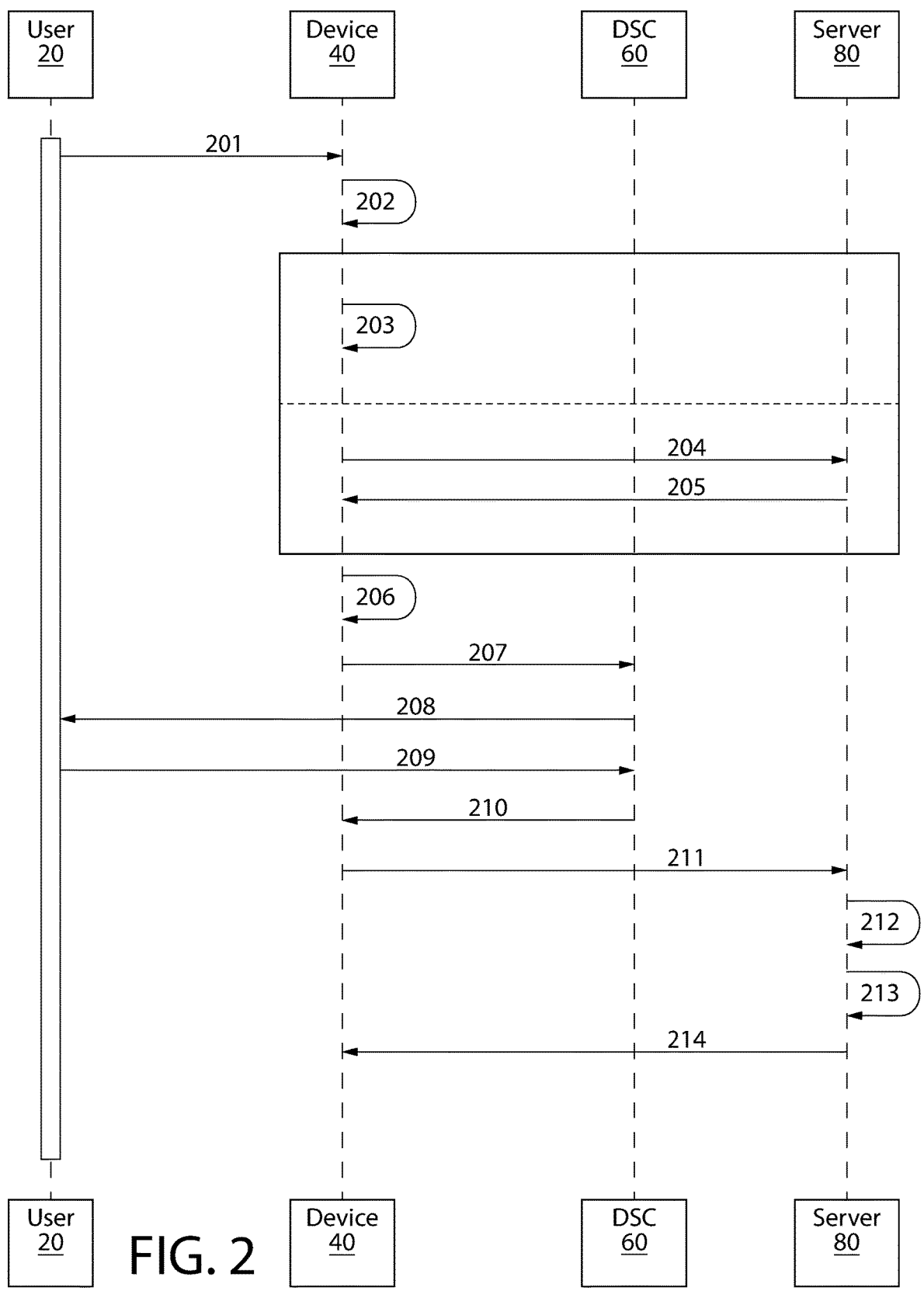
FIG. 2 is a flowchart of an additional call process for subsequent requests according to one embodiment.

Additional Call Process (FIG. 2)

After the user has performed the initial authentication to the device, as described, for example, in FIG. 1, and performed a syncing operation from the device to the server to establish the LTIK, the user will need to make subsequent requests. Subsequent requests to the server from the device will need to perform validation that the requests on the device are originating from the original device. Leveraging the LTIK and the DSC, subsequent requests can perform a similar logical process to digitally sign requests to the server and prove the requests are coming from the trusted device.

In this exemplified embodiment, the user 20 accesses the device 40 (step 201). In performing tasks on the device, the user performs an action that requires a server 80 resource for the device (step 202). Next, either the device will generate a secret on the device (step 203), or the device will ask the server to generate a secret for the device (step 204). If the server generates the secret, the server will return the secret to the device (step 205).

In this embodiment, the device then combines the secret with other metadata from the device to create a combined secret (step 206). The combined secret is then presented to the DSC 60 for the DSC to perform a signature operation (step 207). The DSC prompts the user to authenticate with the device (step 208). Once the user has authenticated with the DSC (step 209), the DSC performs the signature operation using the LTIK private key, returning the signature and the LTIK public key (step 210). The device will then send the combined secret, the signed combined secret, the LTIK public key, the authentication context token, and other information (such as but not limited to device information and GPS coordinates) to the server (step 211).

The server will validate the user, retrieve the associated LTIK for the user, and then validate the combined secret and its signature with the LTIK stored on the server (step 212). Upon successful validation, the users action will continue allowing the desired resource to be consumed (step 213). The server will then return the result of the desired action (step 214).

Figure 3:
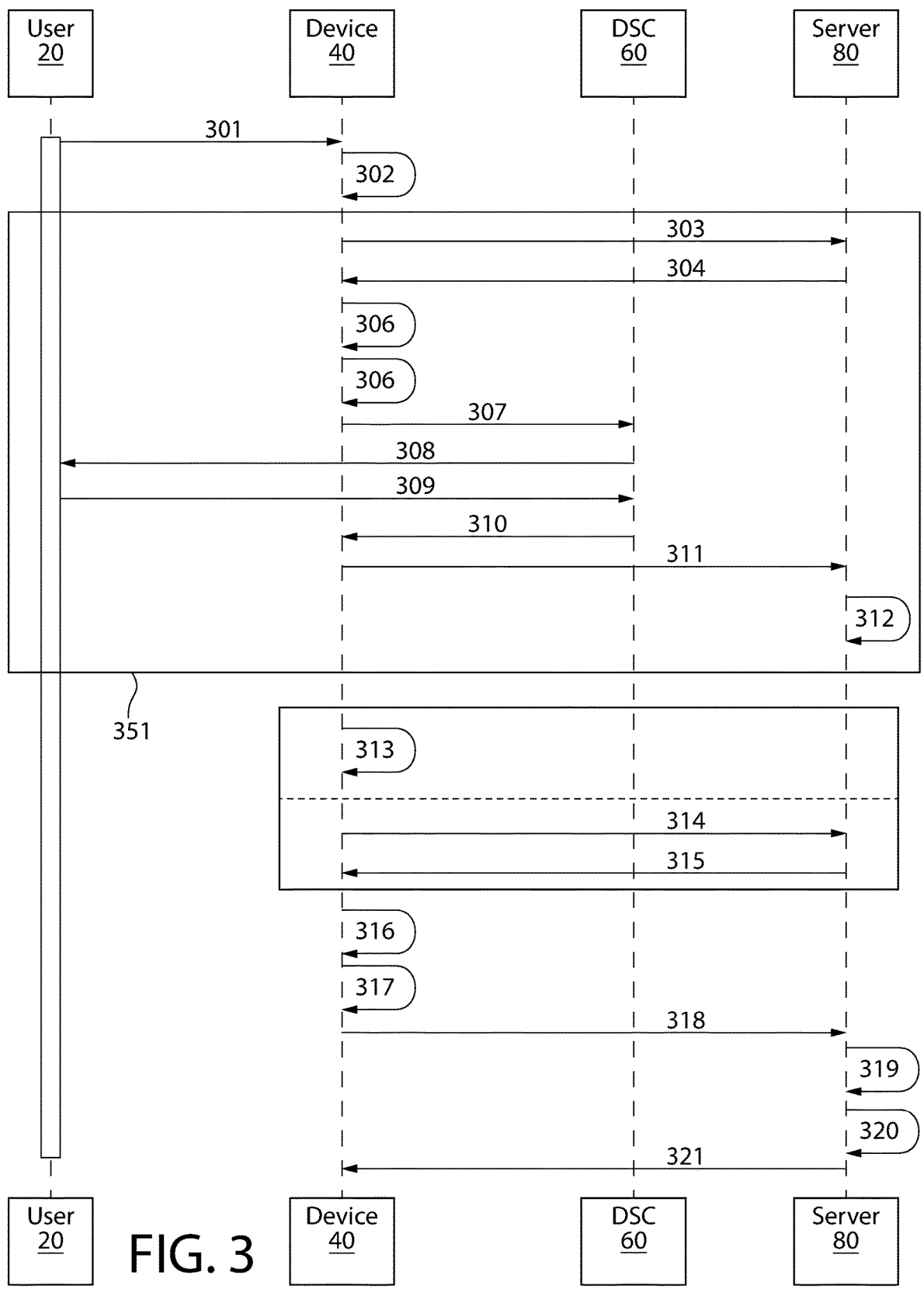
FIG. 3 is a flowchart of process utilizing short term tokens to reduce the need to authenticate according to one embodiment.

Short Term Tokens and Timed Window Signature Pair (FIG. 3)

Much like FIG. 2, the exemplary process shown in FIG. 3 builds upon the concept of authenticating additional calls to the server from the device. The process defined in FIG. 3 is important due to the nature of some DSC. Some DSC will require short windows for users to reauthenticate with the device (for instance, every 5 minutes). This would become cumbersome and annoying for users to be prompted to reauthenticate every 5 minutes with their device to continue using the device. To address this problem, the following process generates short-lived signature key pairs, referred to herein has a Timed Window Signature Pair or TWSP. The TWSP exist outside of the DSC. These TWSP key pairs have a predefined life, for example 30 minutes. When a TWSP is generated, it will be signed by the DSC to prove that it was generated on the trusted device, allowing the device to authenticate with a server as it would if we were signing requests as in FIG. 2.

As shown in FIG. 3, the user 20 launches the device 40 (step 301). In performing tasks on the device, the user performs an action that requires a server 80 resource for the device (step 302). Due to authentication that will need to occur on a regular basis (step 308), the device issues a Timed Window Signature Pair (TWSP). The TWSP enables longer-lived authentication tokens, which are signed by the DSC 60.

In the case where the TWSP does not exist or is invalid (portion 351), the device will ask the server for a secret to sign (step 303). The server will generate the secret and transmit it to the device (step 304). The device then generates an asymmetric key pair (the TWSP) to perform digital signature operations that is not located in the DSC (step 305). The device then combines the secret with other metadata from the device to create a combined secret (step 306). The combined secret is then presented to the DSC to perform a signature operation (step 307).

The DSC prompts the user to authenticate with the device (step 308). Once the user has authenticated with the DSC (step 309), the DSC performs the signature operation using the LTIK private key, returning the signature and the LTIK public key (step 310). The device then sends the combined secret, the signed combined secret, the TWSP public key, the authentication context token, and other information (such as but not limited to device information and GPS coordinates) to the server (step 311). The server will validate the user, retrieve the associated LTIK for the user, and validate the combined secret and its signature with the LTIK stored on the server (step 312).

Upon successful validation, the server stores the TWSP on the server. Once a valid TWSP is available, either the device generates a secret on the device (step 313), or the device asks the server to generate a secret for it (step 314). If the server generates the secret, the server will return the secret to the device (step 315).

The device then combines the secret with other metadata from the device to create a combined secret (step 316). The combined secret is used with the TWSP to perform a signature operation (step 317). The device sends the combined secret, the signed combined secret, the TWSP public key, the authentication context token, and other information (such as but not limited to device information and GPS coordinates) to the server (step 318). The server will validate the user, retrieve the associated TWSP for the user, and validate the combined secret and its signature with the TWSP stored on the server (step 319). Upon successful validation, the users action will continue allowing the desired resource to be consumed (step 320). The server will then return the result of the desired action (321).

Figure 4:
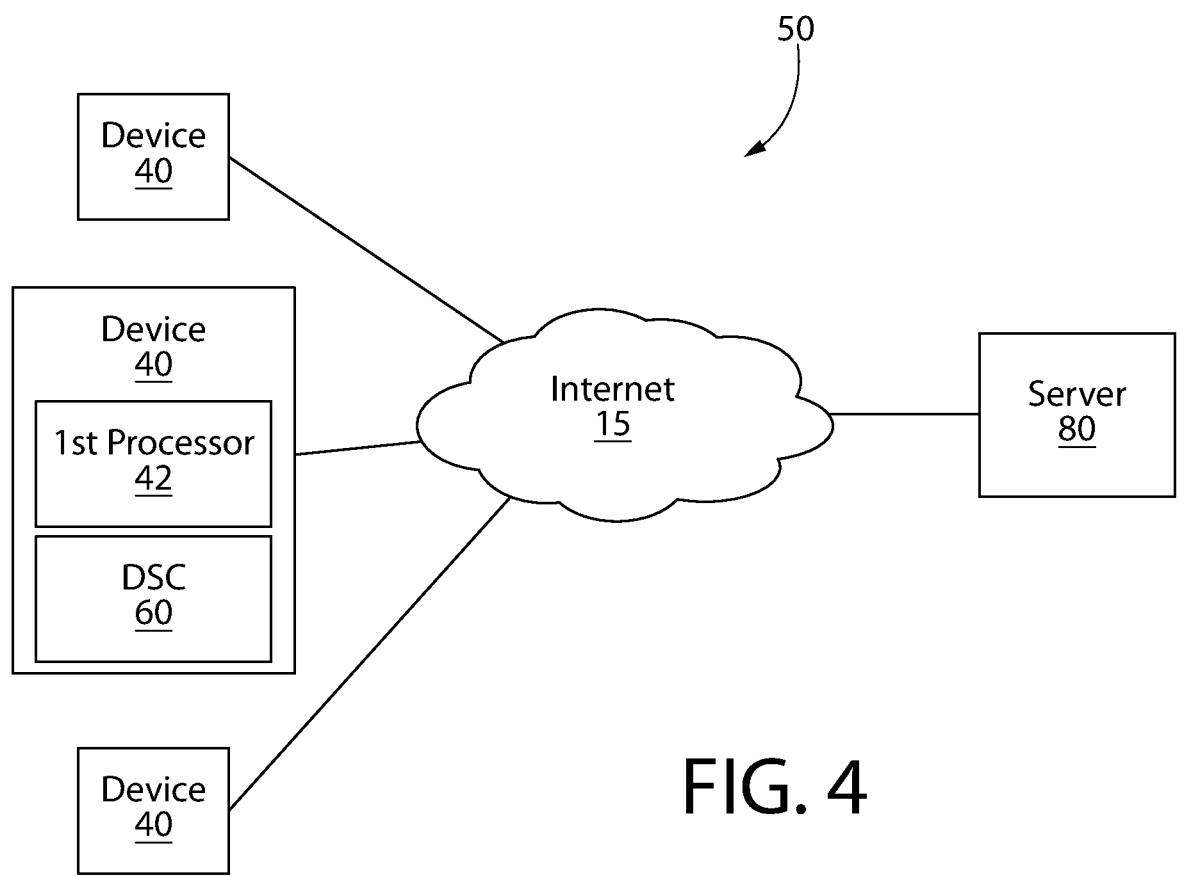
FIG. 4 is a block diagram of a system according to one embodiment.

System (FIG. 4)

FIG. 4 is a block diagram of a system 50 according to one embodiment. The exemplified system 50 includes devices 40 connected to a server 80 through the internet 14. In the exemplified embodiment, the device 40 is a mobile smartphone. But as discussed above, in other embodiments, the device can be any computer device capable of carrying out programs in accordance with the functions described herein, including other mobile devices, laptop computers, desktop computers, tablets, and iOT devices.

The exemplified device 40 includes a first processor 42 for the device's general processing purposes. The first processor 42, for example, can be an ARM-based system on chip (SoC), or an Exynos SoC. These processor typically include a central processing unit (CPU), input/output ports, and secondary storage.

The exemplified device further includes a second processor 60 for carrying out security functionality. As discussed above, this second processor 60 is sometimes referred to herein as the DSC. The second processor or DSC can be any additional processor for carrying out security functionality that also carries out the functions described herein.

The server 80 (and other servers discussed herein) can be any computer or processor (or collection thereof) for carrying out programs in accordance with the functions described herein. In the exemplified embodiment, the server 80 communicates with the devices 40 through an internet connection. In other embodiments, the server 80 can communicate with the devices 40 through other communication means, such as through use of a telecommunication network (e.g., 3G or 4G).

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A system for digital authentication comprising:
    a server;
    a device comprising:
        a first processor comprising a central processing unit (CPU) configured to provide general processing for the device; and
        a second processor separate and distinct from the first processor and dedicated solely to security functionality, the second processor programmed to:
            receive an instruction from the CPU to generate a public key and a private key; and
            use the private key and to-be-signed signature data to generate a first digital signature;
    wherein the generation of the first digital signature comprises:
        generating a secret, or receiving the secret from the server;
        combining the secret with other metadata from the device to create a combined secret;
        generating a device signature comprising device identification information;
        combining the combined secret and the device signature to form the to-be-signed signature data; and
        the second processor signing, by the private key, the to-be-signed signature data to generate the first digital signature;
    wherein the device is programmed to transmit the combined secret, the public key, and the first digital signature to the server;
    wherein the server is programmed to store the public key;
    wherein after the device transmits the combined secret, the public key, and the first digital signature to the server and the server stores the public key, as part of subsequent communication, the device is programmed to generate a second combined secret and a second digital signature by repeating the steps for generating the first digital signature;
    wherein the device is programmed to transmit the second combined secret, the public key, and the second digital signature to the server; and
    wherein the server is programmed to retrieve the public key and, using the public key, validate the second combined secret and the second digital signature to verify that the second combined secret and the second digital signature are from the device or a user of the device, thereby verifying that the subsequent communication is from the device or the user of the device.

2. The system of claim 1 wherein the device is a smartphone, and the server authenticates the user of the smartphone.

3. The system of claim 1 wherein the device is a non-internet-enabled device forming part of an internet of things, and the server authenticates the non-internet-enabled device.

4. The system of claim 1 wherein the server validates the public key.

5. The system of claim 1 wherein and the server validates the first digital signature with the public key.

6. The system of claim 1 wherein the second processor is programmed to generate certificates for public keys.

7. The system of claim 1 wherein the generation of the first digital signature further comprises:
    generating a timestamp indicating a date and time of the generation of the device signature;
    combining the timestamp with the secret and the device signature to form the to-be-signed signature data.

8. The system of claim 7 wherein the server validates the timestamp to ensure that the digital signature was generated within a predetermined period of time.

9. A method of providing digital authentication comprising:
    a) providing a device comprising a first processor and a second processor separate and distinct from the first processor, the first processor comprising a central processing unit (CPU) configured to provide general processing for the device, and the second processor configured to provide security functionality;
    b) the CPU instructing the second processor to generate a public key and a private key;
    c) the device generating, using the private key and to-be-signed signature data, a first digital signature wherein the generation of the first digital signature comprises:
        i) generating a secret, or receiving the secret from the server;
        ii) combining the secret with other metadata from the device to create a combined secret;
        iii) generating a device signature comprising device identification information;
        iv) combining the combined secret and the device signature to form the to-be-signed signature data; and
        v) the second processor signing, by the private key, the to-be-signed signature data to generate the first digital signature;
    d) transmitting, by the device, the combined secret, the public key and the first digital signature to a server; and
    e) storing, at the server, the public key;
    f) after steps d) and e) are completed, as part of subsequent communication, repeating step c) to generate a second combined secret and a second digital signature;
    g) transmitting, by the device, the second combined secret, the public key, and the second digital signature to the server; and h) at the server:
  i) retrieving the public key; and
  ii) using the public key, validating the second combined secret and the second digital signature to verify that the second combined secret and the second digital signature are from the device or a user of the device, thereby verifying that the subsequent communication is from the device or the user of the device.

10. The method of claim 9 wherein the device is a smartphone, and the server authenticates the user of the smartphone.

11. The method of claim 9 wherein the device is a non-internet-enabled device forming part of an internet of things, and the server authenticates the non-internet-enabled device.

12. The method of claim 9 wherein the server validates the public key.

13. The method of claim 9 wherein and the server validates the first digital signature with the public key.

14. The method of claim 9 wherein the second processor is programmed to generate certificates for public keys.

15. The method of claim 9 wherein the generation of the first digital signature further comprises:
  generating a timestamp indicating a date and time of the generation of the device signature;
  combining the timestamp with the secret and the device signature to form the to-be-signed signature data.

16. The method of claim 15 wherein the server validates the timestamp to ensure that the digital signature was generated within a predetermined period of time.

17. The method of claim 15 wherein the server validates that the secret was not previously recorded with the server.

18. The method of claim 15 wherein the server stores the first digital signature.

19. The method of claim 9 wherein:
  the server generates an authentication context token comprising public and secret data;
  the authentication context token is shared between the device and the server; and
  the authentication context token is stored in the device or the server.

* * * * *